US006849822B2

(12) United States Patent
Kiessling et al.

(10) Patent No.: US 6,849,822 B2
(45) Date of Patent: Feb. 1, 2005

(54) COATING COMPOSITION FOR METAL CONDUCTORS AND COATING PROCESS INVOLVING THE USE THEREOF

(75) Inventors: Gerhard Kiessling, Hattingen (DE); Frank-Rainer Boehm, Odenthal (DE); Hans-Georg Hinderer, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/779,364

(22) Filed: Feb. 13, 2004

(65) Prior Publication Data

US 2004/0159634 A1 Aug. 19, 2004

Related U.S. Application Data

(62) Division of application No. 10/032,858, filed on Dec. 27, 2001, now abandoned.

(51) Int. Cl.[7] ................................................ B23K 26/00

(52) U.S. Cl. .............................. 219/121.69; 219/121.85

(58) Field of Search ........................ 219/121.69, 121.85, 219/121.68, 121.67, 121.6

(56) References Cited

U.S. PATENT DOCUMENTS

| | | | | | |
|---|---|---|---|---|---|
| 4,486,506 | A | | 12/1984 | Kenjo et al. | |
| 4,928,838 | A | * | 5/1990 | Imamura | 219/121.69 |
| 5,337,941 | A | | 8/1994 | Higashiura et al. | |
| 5,672,210 | A | * | 9/1997 | Moto et al. | 118/726 |
| 5,932,682 | A | | 8/1999 | Buchwalter et al. | |
| 5,952,271 | A | * | 9/1999 | Moto et al. | 505/474 |
| 6,300,590 | B1 | * | 10/2001 | Lauer et al. | 219/121.6 |

FOREIGN PATENT DOCUMENTS

| | | |
|---|---|---|
| FR | 2 590 744 | 5/1987 |
| WO | WO 00/54286 | 9/2000 |

* cited by examiner

*Primary Examiner*—M. Alexandra Elve
(74) *Attorney, Agent, or Firm*—Steven C. Benjamin

(57) ABSTRACT

A coating composition useful as an electrical insulation layer for metal conductors, particularly wires, that has improved de-coating properties for the partial de-coating of coated conductor by the use of laser irradiation; the coating composition comprises A) 1 wt. % to 90 wt. %, based on the total weight of the binder, of one or more binders, B) 0.3 wt. % to 25 wt. %, based on the total weight of the binder, of one or more reactive particles based on an element-oxygen bound network with elements from the series of aluminum, tin, boron, germanium, gallium, lead, silicon, zinc, the transition metals and the lanthanides and actinides, and C) 0 wt. % to 95 wt. %, based on the total weight of the binder, of one or more conventional additives, solvents, pigments and/or fillers, wherein the total of A)+B)+C) equal 100% and wherein the reactive particles of component B are based on the element-oxygen bound network, on the surface of which reactive functions $R_1$ and optionally, non-reactive and/or partially reactive functions $R_2$ and $R_3$ are bound by way of the oxygen of the network, $R_1$ being contained in an amount up to 98 wt. %, based on the weight of the particles, $R_2$ and $R_3$ in an amount from 0 wt. % to 97 wt. %, based on the weight of the particles, in the particle, in which $R_1$ represents radicals of the metal acid; NCO, urethane, epoxide, epoxy, carboxylic acid anhydride, C═C double bond systems, OH, alcohols bound by way of oxygen, chelating agents, COOH, $NH_2$, $NHR_4$, and/or reactive resin components, $R_2$ represents radicals of aromatic compounds, aliphatic compounds, fatty acid derivatives; esters and/or ethers, $R_3$ represents resin radicals and $R_4$ represents radicals of acrylate, phenol, melamine, polyurethane, polyester, polyester imide, polysulfide, epoxide, polyamide, polyvinyl formal resins; aromatic compounds; aliphatic compounds; esters; ethers; alcoholates and/or chelating agents.

8 Claims, No Drawings

COATING COMPOSITION FOR METAL CONDUCTORS AND COATING PROCESS INVOLVING THE USE THEREOF

CROSS-REFERENCE TO RELATED APPLICATION

This is a divisional of U.S. patent application Ser. No. 10/032,858, filed Dec. 27, 2001 now abandoned, which is hereby incorporated by reference.

BACKGROUND OF THE INVENTION

This invention relates to a coating composition for metal conductors and to the formation of an electrically insulating coating with improved properties that allow for the removal of specific parts of the coating layer.

In the production of machines, for example, motors, generators, and transformers, wires coated with an electrical insulation are used. These coated wires have electrical contacts attached thereto. Before the electrical contact is attached to the wire, the insulation is cleaned from the wire at the point of contact to enable a flow of electrical current.

The insulating coating material for metallic conductors can be enamels with having a high dielectric strength. In a typical production process, these conductors are entirely coated and subsequently selective portions of the insulating coating are removed to ensure an electrical contact of the respective parts.

The removing of the insulating layer from a coated wire can be done by various methods, for example, mechanical or thermal methods. Both methods require a large amount of time and labor. The mechanical method especially presents a problem, the conductor cross-section may be reduced or deformed .on removal of the coating since there is no guarantee that the coating layer can be precisely removed without damaging the conductor. Any damage to the conductor leads to an undesired increase in electrical resistance when the device is operated.

Apart from these two methods, laser irradiation is a known technique for de-coating or removal of an insulating coating from a conductor. The advantage of using laser irradiation is that it is highly precise and can be positioned on the surface enabling the conductor to de-coat specific portions of the coating. The coating or insulating layer should be able to absorb sufficient laser irradiation to completely evaporate the layer. This method generates a high intensity of energy in an area causing a rapid evaporation of the insulating layer from a particular area of the surface.

A problem with the laser method arises if the respective insulating layer of the conductor has too low an absorption of the laser irradiation whereby only the metal conductor is heated, and only a partial or possibly no de-coating occurs.

Known inorganic fillers, particularly pigments, are able absorb the laser energy, convert it into heat and enable an evaporation of the insulating layer by means of laser irradiation. Examples for such fillers and pigments are the silicates known as glimmer pigments, or the pigments used for the laser marking of plastics. These fillers and pigments are not suitable for the use in an insulating coating since they form a sediment in the coating and form a non-homogeneous coating that has a lower flexibility in comparison to standard coatings and is susceptible to cracking due to changes in elongation of the wire.

U.S. Pat. No. 5,337,941 describes a practical de-coating of a wire insulation by use of a laser. This method is not completely satisfactory since a residue of the insulation layer remains on the conductor. This residue can only be removed completely by the use of a soldering material applied at a high temperature.

SUMMARY OF THE INVENTION

This invention provides a coating composition useful as an electrical insulating layer for metal conductors, particularly wires, that has improved de-coating properties for the partial de-coating of coated conductors by the use of laser irradiation. The coating composition has the desired characteristics, such as, flexibility, adherence and thermal behaviour either as single-layer application or as a coating layer in a multi-layer application on electrical conductors.

The coating composition comprises

A) 1 wt. % to 90 wt. %, based on the total weight of the binder, of one or more binders, B) 0.3 wt. % to 25 wt. %, based on the total weight of the binder, of one or more reactive particles based on an element-oxygen bound network with elements from the series of aluminum, tin, boron, germanium, gallium, lead, silicon, zinc, the transition metals and the lanthanides and actinides, and C) 0 wt. % to 95 wt. %, based on the total weight of the binder, of one or more conventional additives, solvents, pigments and/or fillers, wherein the total of A)+B)+C) equal 100% and wherein the reactive particles of component B are based on the element-oxygen bound network, on the surface of which reactive functions $R_1$ and optionally, non-reactive and/or partially reactive functions $R_2$ and $R_3$ are bound by way of the oxygen of the network, $R_1$ being contained in an amount up to 98 wt. %, based on the weight of the particles, $R_2$ and $R_3$ in an amount from 0 wt. % to 97 wt. %, based on the weight of the particles, in the particle, in which $R_1$ represents radicals of the metal acid; NCO, urethane, epoxide, epoxy, carboxylic acid anhydride, C=C double bond systems, OH, alcohols bound by way of oxygen, chelating agents, COOH, $NH_2$, $NHR_4$, and/or reactive resin components, $R_2$ represents radicals of aromatic compounds, aliphatic compounds, fatty acid derivatives; esters and/or ethers, $R_3$ represents resin radicals and $R_4$ represents radicals of acrylate, phenol, melamine, polyurethane, polyester, polyester imide, polysulfide, epoxide, polyamide, polyvinyl formal resins; aromatic compounds; aliphatic compounds; esters; ethers; alcoholates and/or chelating agents.

DETAILED DESCRIPTION OF THE INVENTION

The composition of this invention contains one or more binders as component A) of the kind known and customarily used wire coating. Examples include the following: polyesters, polyester imides, polyamides, polyamide imides, tris-(2-hydroxyethyl)-isocyanurate ("THEIC") polyester imides, polytitanic acid ester-THEIC ester imides, phenolic resins, melamine resins, polymethacrylimides, polyimides, polybismaleinimides, polyether imides, polybenzoxazine diones, polyhydantoins, polyvinyl formals, polyvinyl acetals and/or capped isocyanates. Other binders that can be used include, e.g., epoxides and acrylate resins.

The use of polyesters and/or polyester imides, particularly THEIC-polyester imides is preferred.

Polyesters used may include, for example, those that are well known for wire coating. These may also be polyesters with heterocyclic, nitrogen-containing rings, for example, polyesters with imide and hydantoin and benzimidazole structures condensed into the molecule.

The polyesters include, in particular, condensation products of polyvalent, aliphatic, aromatic and/or cycloaliphatic carboxylic acids and anhydrides thereof, polyhydric alcohols, in the case of imide-containing polyester amino group-containing compounds, optionally, with a proportion of monofunctional compounds, for example, monohydric alcohols.

The saturated polyester imides are based preferably on terephthalic acid polyesters which, in addition to diols, may also contain polyols and, as an additional dicarboxylic acid component, a reaction product of diaminodiphenylmethane and trimellitic anhydride.

Unsaturated polyester resins and/or polyester imides may also be used. The use of unsaturated polyesters and/or polyester imides is preferred.

Polyamides may be used as component A), for example, thermoplastic polyamides and polyamide imides of the kind prepared from, e.g., trimellitic anhydride and isocyanatodiphenyl methane. Examples of phenolic resins and/or polyvinyl formals that may be used as component A) include novolaks obtainable by polycondensation of phenols and aldehydes, or polyvinyl formals obtainable from polyvinyl alcohols and aldehydes and/or ketones. Capped isocyanates may also be used as component A), such as, adducts of polyols, amines or CH-acid compounds (e.g., acetoacetic acid esters, malonic esters) and diisocyanates, wherein cresols and phenols usually are used as capping agents.

The particle of component B) according to the invention is composed of an element-oxygen network on the surface of which the reactive functions $R_1$ and optionally, non-reactive or partially reactive functions $R_2$ and $R_3$ are bound by way of the oxygen of the network. The particles with the described functions $R_1$ to $R_4$ are particles whose average radius is in the range from 1 nm to 300 nm, preferably in a range from 2 nm to 150 nm, particularly preferably, in a range from 10 nm to 100 nm.

The particle according to the invention is contained in the coating composition in an amount from 0.3 wt. % to 25 wt. %, preferably 1 wt. % to 5 wt. %, based on the total weight of the binder of the coating composition.

The element-oxygen bound network of the partide according to the invention contains the above-mentioned elements that are bound by way of oxygen. The network may contain one or more identical or different elements in a regular and/or irregular sequence bound to the oxygen in each case, e.g. particularly of the series comprising silicon, titanium, zinc, yttrium, cerium, vanadium, hafnium, zirconium, nickel and/or tantalum. The inorganic network preferably contains the elements of the series comprising titanium, silicon, aluminium and/or zirconium.

For example, compounds based on the products Nyacol DP 5480 from Nyacol Products Inc. may be used as component B).

Optionally, organic units, such as, radicals of aromatic compounds, aliphatic compounds, esters, ethers, alcoholates, fats and chelating agents, imides, amides, acrylates may also be implemented in the network of the particle according to the invention.

Preferably, $R_1$ is contained in an amount up to 40 wt. %, particularly preferably up to 30 wt. %, $R_2$ and $R_3$ in an amount from 0 wt. % to 40 wt. %, particularly preferably 0 wt. % to 10 wt. % in the particle according to the invention. (The above wt. % are based on the total wt. of the particle.)

$R_1$ represents radicals, e.g., $OTi(OR_4)_3$, $OZr(OR_4)_3$, $OSi(OR_4)_3$, $OSi(R_4)_3$; $OH(OR_4)_3$; NCO; urethane, epoxide, epoxy, carboxylic acid anhydride; C═C double bond systems, such as, methacrylate, acrylate; OH; alcohols bound by way of oxygen, e.g., bis(1-hydroxymethylpropane)-1-methylolate, 2,2-bis-(hydroxymethyl)-1-propanol-3-propanolate, 2-hydroxypropan-1-ol-3-olate, esters, ethers, e.g., 2-hydroxyethanolate, $C_2H_4OH$, diethylene glycolate, $C_2H_4OC_2H_4OH$, triethylene glycolate, $C_2H_4OC_2H_4OC_2H_4OH$; chelating agents, e.g., aminotriethanolate, aminodiethanolate, acetyl acetonate, ethyl acetoacetate, lactate; COOH; $NH_2$; $NHR_4$; and/or esters, reactive resin components such as, OH—, SH—, COOH—, NCO—, capped NCO—, $NH_2$—, epoxy, carboxylic acid anhydride, C═C, metal acid esters, silane-containing polyurethanes, polyesters, poly(THEIC) esters, poly(THEIC)ester imides, polyamide imides, polyamides, polysiloxanes, polysulfides, polyvinyl formals, polymers, e.g., polyacrylates.

The use of $OTi(OR_4)_3$, $OZr(OR_4)_3$, acetyl acetonate, 2-hydroxyethanolate, diethylene glycolate, OH as function $R_1$ is preferred.

$R_2$ represents, e.g., radicals of aromatic compounds, e.g., phenyl, cresyl, nonylphenyl, aliphatic compounds, e.g., branched, linear, saturated, unsaturated alkyl radicals C1 to C30, fatty acid derivatives; linear or branched esters and/or ethers.

$R_3$ represents resin radicals, e.g., polyurethane, polyester, polyester imide, THEIC-polyester imide, polytitanic ester resins and derivatives thereof; polysiloxane resins with organic derivatives; polysulfide, polyamide, polyamide imide, polyvinyl formal resins, and/or polymers such as, polyacrylates, polyhydantoins, polybenzimidazoles.

The use of radicals of polyester imides and/or THEIC polyester imide resins as function $R_3$ is preferred.

$R_4$ represents radicals of e.g. acrylate, phenol, melamine, polyurethane, polyester, polyester imide, polysulfide, epoxide, polyamide, polyvinyl formal resins; aromatic compounds, e.g., phenyl, cresyl, nonylphenyl; aliphatic compounds, e.g., branched, linear, saturated, unsaturated alkyl radicals with C1 to C30; esters; ethers, e.g., methyl glycolate, methyl diglycolate, ethyl glycolate, butyl diglycolate, diethylene glycolate, triethylene glycolate; alcoholates, e.g., 1-hydroxymethyl-propane-1,1-dimethylolate, 2,2-bis-(hydroxymethyl)-1,3-propane diolate, 2-hydroxypropane-1,3-diolate, ethylene glycolate, neopentyl glycolate, hexane diolate, butane diolate; fats, e.g., castor oil and/or chelating agents, e.g., aminotriethanolate, aminodiethanolate, acetyl acetonate, ethyl acetoacetate, lactate.

The use of acrylate resin, aminotriethanolate, acetyl acetonate, polyurethane resin and butyl diglycolate as function $R_4$ is preferred.

The radicals $R_1$ to $R_4$ in each case may be the same or different.

Examples of the particles of component B) that may be used according to the invention are described in WO 00/54286, FIGS. 1 to 4.

The organic radicals Z stand for isopropyl, butyl, butyldiglycol, triethanolamine, acetyl acetone, polyamide imide, polyurethane and polyester imide groups and aminotriethanolate and epoxide groups, particularly selected from the group comprising $R_4$.

In addition to the particles of component B) used according to the invention, monomeric and/or polymeric element-organic compounds may be contained in the coating composition. Examples of polymeric element-organic compounds include inorganic-organic hybrid polymers. Examples of monomeric element-organic compounds include ortho-titanic acid esters and/or ortho-zirconic acid esters, for example, nonyl, cetyl, stearyl, triethanolamine, diethanolamine, acetyl acetone, acetoacetic acid esters, tetra-isopropyl, cresyl, tetrabutyl titanate or zirconate, and titanium tetralactate, hafnium and silicon compounds, e.g., hafnium tetrabutoxide and tetraethyl silicate and/or various silicone resins.

Additional polymeric and/or monomeric element-organic compounds of this kind may be contained in the composition according to the invention in an amount from 0 wt. % to 70 wt. %, based on the total weight of the binder of the coating composition.

The preparation of component B) may take place by conventional hydrolysis and condensation reactions of appropriate element-organic or element-halogen compounds in the presence of organic reactants corresponding to functions $R_1$ to $R_3$.

Similarly, organic resin and/or particle components may be reacted with corresponding element-oxide compounds to the corresponding particles.

Such methods of preparation are known to the skilled person, see, e.g., Ralph K. Iler, John Wiley and Sons, "The Chemistry of Silica", New York, p. 312 ff, 1979.

The compositions may contain pigments and/or fillers as component C), for example, color-imparting inorganic and/or organic pigments, such as, titanium dioxide or carbon black, and special-effect pigments, such as, metal flake pigments and/or pearlescent pigments. Examples of additives contained include conventional paint additives, for example, extenders, plasticising components, accelerators (e.g., metal salts, substituted amines), initiators (e.g., photoinitiators, initiators that respond to heat), stabilizers (e.g., hydroquinones, quinones, alkyl phenols, alkyl phenol ethers), defoamers, levelling agents.

In order to increase solubility, the compositions may contain organic solvents, such as, aromatic hydrocarbons, N-methylpyrrolidone, cresols, phenols, xylenols, styrenes, vinyl toluene, methyl acrylates. The compositions according to the invention may contain, for example, 30 wt. % to 95 wt. %, based on the weight of the composition, of organic solvents.

Optionally, the composition according to the invention may also be mixed with conventional wire coatings and then applied by conventional methods.

The application of the composition according to the invention may take place by conventional methods irrespective of the type and diameter of the wire used. The wire may be coated directly with the composition according to the invention and then stoved (baked) in an oven. Coating and stoving may optionally take place several times in succession. The ovens may be arranged horizontally or vertically, the coating conditions, such as, duration and number of coatings, stoving temperature, coating speed depending on the nature of the wire to be coated. For example, the coating temperatures may be in the range from room temperature to 400° C. Moreover, ambient temperatures above 400° C., for example, up to 800° C. and above may also be possible during coating without any discernable deterioration in the quality of the coating according to the invention.

During the stoving (baking) process, the components of the composition according to the invention, particularly component A) and component B) may undergo a chemical reaction with one another. Depending on the chemical nature of components A) and B), various chemical reactions are possible, for example, transesterification reactions, polymerization reactions, addition reactions, condensation reactions. According to the preferred use of components A) and B), condensation reactions may take place preferentially.

The use of the composition according to the invention may take place irrespective of the nature and diameter of the wire; for example, wires with a diameter from 0.005 mm to 12 mm may be coated. Suitable wires include conventional metal conductors, for example, of copper, aluminium, zinc, iron, gold, silver or alloys thereof.

The coating composition according to the invention may be contained as a constituent of a multi-layer coating of the wire. This multi-layer coating may contain at least one coating composition according to the invention. According to the invention, the wires may be coated with or without coatings already present. Existing coatings may include, for example, flame retardant coatings, primers. In such cases, the layer thickness of the coating according to the invention may differ considerably.

It is also possible to undertake further coatings by way of the coating according to the invention, for example, further insulation coatings. Such coatings may also be used, e.g., as a top coat for improved mechanical protection and for the creation of desired surface properties and for improving the smoothness of the surface. For example, compositions based on polyamides, polyamide imides and polyimides are particularly suitable as top coats.

More particularly, the composition according to the invention is also suitable for a one-coat application.

According to the invention, the composition may be applied in conventional layer thicknesses. It is also possible to apply thin layers without affecting the partial discharge resistance obtained according to the invention, and the adhesion, strength and extensibility of the coatings. The dry layer thickness may vary in accordance with the standardized values for thin and thick wires.

The wire coated according to the invention can be used in electrical devices, such as, bobbins, for example, in motors, generators, ignition coils and transformers.

As described above, it is necessary when forming an electrical contact, to de-coat the corresponding contact connections of the coated wires. For this purpose these parts are exposed to a laser irradiation. A suitable system could, for example, be a laser irradiation system operating, for example, with optical glass fibers. The laser beam can be positioned and focussed precisely by additionally using so-called scanner systems. Moreover, it is possible by a corresponding arrangement of the laser systems to cause an overlapping of the individual laser points whereby the point accuracy of the laser irradiaton can be increased.

For the invention all common laser types can be used, for example, Excimer-, Rubin-, Nd:YAG-, Argon-, Holmium- and $CO_2$-laser systems. Preferable types are $CO_2$ -and Nd:YAG laser type. The Nd:YAG laser is most preferred.

The laser irradiation power can, for example, amount to 10 Watt and can be within a range of 10 to 5000 Watt, preferred 10 to 500 Watt, most preferred 30 to 120 Watt.

Compared to all currently known coating compositions, the coating obtained with the composition according to the invention allows for an increased and accurate removal of the insulating coating on an electrical conductor by means of laser irradiation without any damaging the conductor. Removing of the coating can occur exactly on the desired spot and without leaving residues and can occur homogeneously, as desired. By means of the laser technique a residue-free removal of the insulating coating is possible ensuring an electrical contact of the electrical devices without any complications.

Besides this, it is also possible to remove pollutants that might perhaps be found on the metallic conductor. On the other hand, the coatings according to the invention meet the demands of a wire enamel with regard to its loading capacity and life time, and especially in view of thermal stability as well as transparency of the coating, flexibility and other coating properties. The application units for a standard coating process can be used without any problem. The coating composition of the invention normally will not contain any sediment.

The following examples illustrate the invention. All parts and percentages are on a weight basis unless otherwise indicated.

EXAMPLES

Tests used in the Examples:

| | |
|---|---|
| Solids content 1 g, 1 h, 180° C. [%] | DIN EN ISO 3251 |
| Viscosity at 25° C. [mPas] resp . . . [Pas] | DIN 53015 |

Example 1a Conventional Wire Enamel 261.2 g of tris-(2-hydroxyethyl)-isocyanurate (THEIC), 93.2 g of ethylene glycol, 194.2 g of dimethyl terephthalate (DMT) and 0.5 g of zinc acetate were heated to 210° C. within a period of 4 hours in a 2 litre three-necked flask equipped with stirrer, thermometer and distillation unit. 60 g of methanol were distilled. After cooling to 150° C., 192.1 g of trimellitic anhydride (TMA) and 99.0 g of methylene dianiline (DADM) were added. The mixture was heated with stirring to 220° C. within a period of 3 hours and kept at this temperature for an additional 3 hours. 33 g of water were distilled. The mixture was then cooled to 180° C. and 500 g of cresol were added.
With further stirring, a ready to use formulation of the resin solution present was prepared with 882.0 g of cresol, 273.0 g of Solvesso® 100, 100.0 g of xylene, 9.0 g of a commercial phenolic resin A, 45.0 g of a commercial phenolic resin B and 18.0 g of ortho-titanic acid-tetrabutylester. The resulting wire coating had a solids content of 31.3% and a viscosity of 410 mPas.

Example 1 b 3 g "Iriodin LS820" pigment on the basis of glimmer/TiO2/(Sn/Sb)O2 from Merck KgaA/Darmstadt were added to 1000 g enamel as per example 1a and dispersed for 1 h. The resulting wire enamel had a solids content of 31.5% and a viscosity of 580 mpas. After 7 days of storage, the solids material started to separate from the enamel. The paintability was bad, i.e., the wire coating properties of the enamel were not acceptable.

Example 1 c 9 g "Iriodin LS820" were added to 1000 g enamel as per example 1a and dispersed for 1 h. The resulting wire enamel had a solids content of 32.2% and a viscosity of 640 mPas. After 7 days of storage, the solids material started to separate from the enamel. The paintability was bad, i.e., the wire coating properties of the enamel were not acceptable.

Example 2a 20 g "Nyacol DP 5480" (reactive particle with OH functions, 30% in ethylene glycol, precipitation silicic acid, radius: 25 nm, from Nyacol Corp.) were added with sufficient stirring to 1800 g of the wire enamel as per example 1a and are stirred for 60 min. An enamel dispersion was formed having a solids content of 30.4% and a viscosity of 470 mPas.

Example 2b 40 g "Nyacol DP 5480" were added with sufficient stirring to 1800 g of the wire enamel as per example 1a and are stirred for 60 min. An enamel dispersion was formed having a solids content of 30.6% and a viscosity of 450 mpas.

Example 2c 200 g "Nyacol DP 5480" were added with sufficient stirring to 1800 g of the wire enamel as per example 1a and are stirred for 60 min. An enamel dispersion was formed having a solids content of 30.9% and a viscosity of 390 mPas.

Example 3

400 g "Nyacol DP 5480" were added with sufficient stirring to 1600 g of the wire enamel as per example 1a and are stirred for 60 min. An enamel dispersion was formed having a solids content of 30,6% and a viscosity of 370 mPas.

Example 4

In a 2 litre three-necked flask equipped with stirrer, thermometer and distillation unit, 130.5 g of tris-(2-hydroxyethyl)-isocyanurate (THEIC), 62.0 g of ethylene glycol, 194.2 g of dimethyl terephthalate (DMT) were mixed thoroughly with 20.0 g of an OH-functional Si—O nanomer (average radius: 25 nm), at 70° C. to 80° C. with vigorous stirring and then heated with 0.5 g of zinc acetate to 210° C. within a period of 4 hours. 60 g of methanol were distilled. After cooling to 150° C., 192.1 g of trimellitic anhydride (TMA) and 99.0 g of methylene dianiline (DADM) were added. The mixture was heated to 220° C. within a period of 3 hours, with stirring, and kept at this temperature for an additional 3 hours. 33 g of water were distilled. The mixture was then cooled to 180° C. and 500.0 g of cresol were added.

With further stirring, a ready to use formulation of the resin solution present was prepared with 630.0 g of cresol, 100.0 g of xylene, 9.2 g of a commercial phenolic resin A, 46.2 g of a commercial phenolic resin B and 18.4 g of ortho-titanic acid-tetrabutylester.

The resulting wire coating had a solids content of 32.4% and a viscosity of 530 mPas.

Example 5

In a 2 litre three-necked flask equipped with stirrer, thermometer and distillation unit, 261.2 g of tris-(2-hydroxyethyl)-isocyanurate (THEIC), 93.2 g of ethylene glycol, 194.2 g of dimethyl terephthalate (DMT) and 0.5 g of zinc acetate were heated to 210° C. within a period of 4 hours. 60 g of methanol were distilled. After cooling to 150° C., 192.1 g of trimellitic anhydride (TMA) and 99.0 g of methylene dianiline (DADM) were added. The mixture was heated to 220° C. within a period of 3 hours, with stirring, and kept at this temperature for an additional 3 hours. 33 g of water were distilled. The mixture was then cooled to 180°

C. and 400 g of cresol were added. 45.0 g of ortho-titanic acid-tetra-isopropyl ester were added at 60° C. to 80° C. and, with vigorous stirring, 23.0 g of an OH-functional Al—O—Si—O nanomer (average radius: 20 nm) from Nyacol Corp., and heated to 205° C. within a period of 5 hours, and 38.2 g of isopropanol were distilled. After cooling and with further stirring, a ready to use formulation of the resin solution present was prepared with 1000.0 g of cresol, 102.0 g of Solvesso® 100, 79.0 g of xylene, 11.0 g of a commercial phenolic resin A, 50.0 g of a commercial phenolic resin B.

The resulting wire coating had a solids content of 32.9% and a viscosity of 520 mpas.

The examples 2-5 are clear, stable, and colloidal solutions.

Application

Copper wires with a bare wire thickness of 1.0 mm were coated on a conventional wire enamelling plant with the wire enamels described according to Examples 2 to 5 and Comparison Examples 1a, 1b and 1c. In each case, a single-layer coating was applied.

The wire enamel la listed in Table 1 corresponds to a conductor wire coated with an enamel from example 1a. The total coating thickness is 30 microns.

The wire enamel 1b listed in Table 1 corresponds to a conductor wire coated with an enamel from example 1b. The total coating thickness is 41 microns. The surface quality was bad.

The wire enamel listed in Table 1 corresponds to a conductor wire coated with an enamel from example 1a. The total coating thickness is 30 microns.

The wire enamel 1c listed in Table 1 corresponds to a conductor wire coated with an enamel from example 1c. The total coating thickness is 40 microns.

The wire enamel 2a listed in Table 1 corresponds to a conductor wire coated with an enamel from example 2a. The total coating thickness is 43 microns.

The wire enamel 2b listed in Table 1 corresponds to a conductor wire coated with an enamel from example 2b. The total coating thickness is 42 microns.

The wire enamel 2c listed in Table 1 corresponds to a conductor wire coated with an enamel from example 2c. The total coating thickness is 43 microns.

The wire enamel 3 listed in Table 1 corresponds to a conductor wire coated with an enamel from example 3. The total coating thickness is 39 microns.

The wire enamel 4 listed in Table 1 corresponds to a conductor wire coated with an enamel from example 4. The total coating thickness is 39 microns.

The wire enamel 5 listed in Table 1 corresponds to a conductor wire coated with an enamel from example 5. The total coating thickness amounts to 39 microns.

The wire enamel 6 listed in Table 1 corresponds to a conductor wire coated with an enamel from example 2b (coating thickness: 30 microns) overcoated (thickness: 11 microns) with a commercial polyamide imide wire enamel (for example, grade E 3564 from DuPont Performance Coatings GmbH & Co. KG). The total coating thickness amounts to 41 microns.

The wire enamel 7 listed in Table 1 corresponds to a conductor wire coated with an enamel from example 2b (coating thickness: 10 microns) overcoated (thickness: 33 microns) with a commercial polyamide imide wire enamel (for example, grade E 3564 from DuPont Performance Coatings GmbH & Co. KG). The total coating thickness amounts to 43 microns.

The wire enamel 8 listed in Table 1 corresponds to a conductor wire coated with an enamel from example 1 (coating thickness: 10 microns) overcoated with a wire enamel from example 2b (thickness: 30 microns). The total coating thickness amounts to 40 microns.

The wire enamel 9 listed in Table 1 corresponds to a conductor wire coated with an enamel from example 1 (coating thickness: 10 microns) overcoated with a wire enamel from example 2b (thickness: 20 microns). The resulting wire enamel is again overcoated (thickness: 10 microns) with a commercial polyamide imide wire enamel (E 3564). The total coating thickness amounts to 40 microns.

TABLE 1

Technical data of the obtained enamelled copper wires (acc. to DIN 46453 bzw. DIN EN 60851) incl. De-coating

| | Enamel wire | | | | | | | | | | | | |
|---|---|---|---|---|---|---|---|---|---|---|---|---|---|
| | 1a | 1b | 1c | 2a | 2b | 2c | 3 | 4 | 5 | 6 | 7 | 8 | 9 |
| Coat thickness | 39 μm | 41 μm | 40 μm | 43 μm | 42 μm | 43 μm | 39 μm | 39 μm | 39 μm | 41 μm | 43 μm | 40 μm | 40 μm |
| Softening point | 394° C. | 398° C. | 392° C. | 396° C. | 402° C. | 404° C. | 399° C. | 402° C. | 400° C. | 404° C. | 403° C. | 398° C. | 399° C. |
| Thermal shock | 220° C. | 220° C. | 220° C. | 220° C. | 220° C. | 220° C. | 220° C. | 220° C. | 200° C. | 240° C. | 240° C. | 220° C. | 240° C. |
| Adhesion/ Extensibility During wrapping (1 × d) | 25% | 15% | 10% | 25% | 25% | 15% | 15% | 20% | 20% | 25% | 25% | 25% | 25% |
| Pencil hardness | 3–4 H | na | na | 4–5 H | 5 H | 6–7 H | 6–7 H | 5–6 H | 5 H | 6–7 H | 6–7 H | 5 H | 6–7 H |
| Paintability | ok | bad | very bad | ok | ok | ok | ok | ok | ok | ok | ok | ok | ok |
| Removability by Laser* | 6 | 3 | 2 | 2 | 1 | 1 | 1 | 1 | 2 | 1 | 2 | 2 | 2 |

Nd: YAG Laser (Clean Lasersysteme GmbH) im gütegeschalteten Betrieb (Q-switch), laser power: 60 Watt, 2-axis Scansystem, focal distance: f = 160 mm, operating field: ca. 120 × 120 mm, Spot diameter: approx. 300 μm, track distance: 0, 15 mm

*Removability by laser irradiation:

1—very good, no enamel residues

6—bad removing, significant enamel residues

What is claimed is:

1. A process for removing a selected portion of a coating from a coated metal conductor comprising irradiating a selected portion of the coating of the coated metal conductor with laser irradiation in the range of medium to high energy thereby vaporizing the selected portion of the coating without leaving a residue of the coating on the metal conductor; wherein the coating comprises A) 1 wt. % to 90 wt. %, based on the total weight of the binder, of one or more binders, B) 0.3 wt. % to 25 wt. %, based on the total weight of the binder, of one or more reactive particles based on an element-oxygen bound network with elements selected from the group consisting of aluminum, tin, boron, germanium, gallium, lead, silicon, zinc, the transition metals, the lanthanides, and actinides, and C) 0 wt. % to 95 wt. %, based on the total weight of the binder, of one or more conventional additives, solvents, pigments, and/or fillers, wherein the total of A)+B)+C) equal 100% and wherein the reactive particles of component B are based on the element-oxygen network, on the surface of which reactive functions $R_1$ and optionally, non-reactive and/or partially reactive functions $R_2$ and $R_3$ being bound by way of the oxygen of the network, $R_1$ being contained in the particles in an amount up to 98 wt. %, based on the weight of the particles, and $R_2$ and $R_3$ being contained in the particles in an amount from 0 wt. % to 97 wt. %, based on the weight of the particles;

wherein $R_1$ represents radicals of the metal acid esters, NCO, urethane, epoxide, epoxy, carboxylic acid anhydride, C=C double bond systems, OH, alcohols bound by way of oxygen, esters, ethers, chelating agents, COOH, $NH_2$, $NHR_4$ and/or reactive resin components;

$R_2$ represents radicals of aromatic compounds, aliphatic compounds, fatty acid derivatives, esters, and/or ethers, $R_3$ represents resin radicals, and $R_4$ represents radicals of acrylate, phenol, melamine, polyurethane, polyester, polyester imide, polysulfide, epoxide, polyamide, polyvinyl formal resins; aromatic compounds, aliphatic compounds, esters, ethers, alcoholates, fats, or chelating agents.

2. The process of claim 1, wherein the coating contains 2 to 5 wt. % based on the total weight of the binder, of one or more reactive particles of component B.

3. The process of claim 1, wherein the radical $R_1$ is selected from the group consisting of $OTi(OR_4)_3$, $OZr(OR_4)_3$, acetyl acetonate, 2-hydroxyethanolate, and diethylene glycolate.

4. The process of claim 1, wherein $R_3$ is selected from the group consisting of radicals of polyester imides, tris-(2-hydroxyethyl)-isocyanurate polyester imides, and mixtures thereof.

5. The process of claim 1, wherein $R_4$ is selected from the group consisting of radicals of acrylate resins, aminotriethanolate, acetyl acetonate, polyurethane resins, butyl diglycolate, and mixtures thereof.

6. The process of claim 1, wherein the reactive particles of component B contain a network of elements bound by oxygen selected from the group consisting of titanium, aluminum, silicon, zirconium, and mixtures thereof.

7. The process of claim 6, wherein the reactive particles of component B have an average radius of from 2 nm to 150 nm.

8. The process of claim 1, wherein the coatings contain up to 7 wt. %, based on the total weight of the binder, of additional monomeric and/or polymeric element-organic compounds selected from the group consisting of orthotitanic acid ester, orthozirconic acid ester, titanium tetralactate, hafnium tetrabutoxide, tetraethyl silicate, silicone resins, and mixtures thereof.

* * * * *